US008588298B2

(12) United States Patent
Srinivasan

(10) Patent No.: US 8,588,298 B2
(45) Date of Patent: *Nov. 19, 2013

(54) HARMONIC QUANTIZER SCALE

(75) Inventor: Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/468,643

(22) Filed: May 10, 2012

(65) Prior Publication Data

US 2012/0224627 A1    Sep. 6, 2012

Related U.S. Application Data

(63) Continuation of application No. 11/676,263, filed on Feb. 16, 2007, now Pat. No. 8,184,694, which is a continuation-in-part of application No. 11/418,690, filed on May 5, 2006.

(51) Int. Cl.
*H04L 29/06*    (2006.01)

(52) U.S. Cl.
USPC ............ 375/240.03; 375/240.01; 375/240.19; 375/240.04; 382/251; 348/398.1

(58) Field of Classification Search
USPC .......................... 375/240.03, 240.01, 240.04
See application file for complete search history.

(56) References Cited

U.S. PATENT DOCUMENTS

| 4,583,114 A | 4/1986 | Catros |
| 4,679,079 A | 7/1987 | Catros et al. |
| 4,774,574 A | 9/1988 | Daly et al. |
| 4,821,119 A | 4/1989 | Gharavi |
| 4,862,264 A | 8/1989 | Wells et al. |
| 4,965,830 A | 10/1990 | Barham et al. |
| 4,992,889 A | 2/1991 | Yamagami et al. |
| 5,072,295 A | 12/1991 | Murakami et al. |

(Continued)

FOREIGN PATENT DOCUMENTS

| CA | 1327074 | 2/1994 |
| EP | 0932306 | 7/1999 |

(Continued)

OTHER PUBLICATIONS

"Time-Domain Algorithms for Harmonic Reduction and Time Scaling of Speech Signals" IEEE Transactions on Acoustics, Speech, and Signal Processing, vol. ASSP-27, No. 2, Apr. 1979, by David Malah.*

(Continued)

*Primary Examiner* — Taghi Arani
*Assistant Examiner* — Jason Lee
(74) *Attorney, Agent, or Firm* — Klarquist Sparkman, LLP

(57) ABSTRACT

A digital media encoder/decoder performs quantization/dequantization based on quantization parameters taken from a harmonic quantizer scale. The harmonic quantizer scale can include a normal portion consisting of quantization parameter values harmonically-related as simple fractions of each other, and a denormal portion of quantizers having a linear or other relation. The encoder/decoder further supports a scaled quantizer mode where quantization is performed based on the quantization parameter as scaled by a fractional value. A compressed domain contrast adjustment is effected by adjusting the quantization parameters in the compressed bitstream, without having to adjust and recode the digital media data in the compressed bitstream.

19 Claims, 9 Drawing Sheets

(56) References Cited

U.S. PATENT DOCUMENTS

| | | |
|---|---|---|
| 5,128,758 A | 7/1992 | Azadegan et al. |
| 5,136,377 A | 8/1992 | Johnston et al. |
| 5,144,426 A | 9/1992 | Tanaka et al. |
| 5,146,324 A | 9/1992 | Miller et al. |
| 5,179,442 A | 1/1993 | Azadegan et al. |
| 5,237,410 A | 8/1993 | Inoue |
| 5,241,395 A | 8/1993 | Chen |
| 5,253,058 A | 10/1993 | Gharavi |
| 5,263,088 A | 11/1993 | Hazu et al. |
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,590,139 A | 12/1996 | Suzuki et al. |
| 5,606,371 A | 2/1997 | Klein Gunnewiek et al. |
| 5,623,424 A | 4/1997 | Azadegan et al. |
| 5,629,779 A | 5/1997 | Jeon |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Fujiwara |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy et al. |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 * | 4/2002 | Florencio et al. ........ 375/240.19 |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,693,645 B2 | 2/2004 | Bourges-Sevenier |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | Van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 * | 6/2005 | Puri et al. ................. 375/240.01 |

(56) References Cited

U.S. PATENT DOCUMENTS

| | | |
|---|---|---|
| 6,947,045 B1 | 9/2005 | Ostermann et al. |
| 6,975,680 B2 | 12/2005 | Demos |
| 6,977,659 B2 | 12/2005 | Dumitras et al. |
| 6,983,018 B1 | 1/2006 | Lin et al. |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,099,515 B2 | 8/2006 | Lin et al. |
| 7,110,455 B2 | 9/2006 | Wu et al. |
| 7,162,096 B1 | 1/2007 | Horowitz |
| 7,200,277 B2 | 4/2007 | Joshi et al. |
| 7,280,700 B2 | 10/2007 | Tourapis et al. |
| 7,289,154 B2 | 10/2007 | Gindele |
| 7,295,609 B2 | 11/2007 | Sato et al. |
| 7,301,999 B2 | 11/2007 | Filippini et al. |
| 7,307,639 B1 | 12/2007 | Dumitras et al. |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 | 8/2011 | Zuo et al. |
| 2001/0048718 A1 | 12/2001 | Bruls et al. |
| 2002/0021756 A1 | 2/2002 | Jayant et al. |
| 2002/0024999 A1 | 2/2002 | Yamaguchi et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136297 A1 | 9/2002 | Shimada et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0185420 A1 | 10/2003 | Sefcik et al. |
| 2003/0194010 A1 | 10/2003 | Srinivasan et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2003/0235247 A1 | 12/2003 | Wu et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0123048 A1 | 6/2005 | Kondo et al. |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote |
| 2006/0126728 A1 | 6/2006 | Yu et al. |
| 2006/0133478 A1 | 6/2006 | Wen |
| 2006/0133479 A1 | 6/2006 | Chen et al. |
| 2006/0140267 A1 | 6/2006 | He et al. |
| 2006/0165176 A1 | 7/2006 | Raveendran et al. |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1* | 11/2006 | Samadani ............... 382/251 |
| 2006/0268990 A1 | 11/2006 | Lin et al. |
| 2006/0268991 A1 | 11/2006 | Segall et al. |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081586 A1 | 4/2007 | Raveendran et al. |
| 2007/0081588 A1 | 4/2007 | Raveendran et al. |
| 2007/0140333 A1 | 6/2007 | Chono et al. |
| 2007/0147497 A1 | 6/2007 | Bao et al. |
| 2007/0160138 A1 | 7/2007 | Wedi et al. |
| 2007/0160151 A1 | 7/2007 | Bolton et al. |
| 2007/0189626 A1 | 8/2007 | Tanizawa et al. |
| 2007/0201553 A1 | 8/2007 | Shindo |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |

(56) References Cited

U.S. PATENT DOCUMENTS

| | | |
|---|---|---|
| 2007/0258519 A1 | 11/2007 | Srinivasan |
| 2008/0008394 A1 | 1/2008 | Segall |
| 2008/0031346 A1 | 2/2008 | Segall |
| 2008/0068446 A1 | 3/2008 | Barkley et al. |
| 2008/0080615 A1 | 4/2008 | Tourapis et al. |
| 2008/0089410 A1 | 4/2008 | Lu et al. |
| 2008/0101465 A1 | 5/2008 | Chono et al. |
| 2008/0144951 A1 | 6/2008 | Zhang |
| 2008/0187042 A1 | 8/2008 | Jasinschi |
| 2008/0192822 A1 | 8/2008 | Chang et al. |
| 2008/0240235 A1 | 10/2008 | Holcomb et al. |
| 2008/0240250 A1 | 10/2008 | Lin et al. |
| 2008/0240257 A1 | 10/2008 | Chang et al. |
| 2008/0260278 A1 | 10/2008 | Zuo et al. |
| 2008/0304562 A1 | 12/2008 | Chang et al. |
| 2009/0207919 A1 | 8/2009 | Yin et al. |
| 2009/0213930 A1 | 8/2009 | Ye et al. |
| 2009/0245587 A1 | 10/2009 | Holcomb et al. |
| 2009/0290635 A1 | 11/2009 | Kim et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 1465349 | 10/2004 |
| EP | 1871113 | 12/2007 |
| GB | 897363 | 5/1962 |
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2001-358948 | 12/2001 |
| JP | 2002-058029 | 2/2002 |
| JP | 2003061090 | 2/2003 |
| JP | 2003-230142 | 8/2003 |
| JP | 2004-023288 | 1/2004 |
| JP | 2004-247889 | 9/2004 |
| JP | 6-296275 | 10/2004 |
| JP | 2005-260467 | 9/2005 |
| JP | 2007-281949 | 10/2007 |
| KR | 132895 | 10/1998 |
| RU | 2119269 | 9/1998 |
| RU | 2119727 | 9/1998 |
| RU | 2127962 | 3/1999 |
| WO | WO 93/09636 | 5/1993 |
| WO | WO 97/21302 | 6/1997 |
| WO | WO 99/25121 | 5/1999 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |
| WO | WO 02/080575 | 10/2010 |

OTHER PUBLICATIONS

Atzori et al., "Adaptive Anisotropic Filtering (AAF) for Real-Time Visual Enhancement of MPEG-Coded Video Sequences," IEEE Transactions on Circuits and Systems for Video Technology, vol. 12, No. 5, pp. 285-298 (May 2002).

Augustine et al., "Region of Interest Editing of MPEG-2 Video Streams in the Compressed Domain," 2004 IEEE Int'l Conf. on Multimedia and Expo: ICME'04, vol. 1, Issue 27-30, pp. 559-562 (Jun. 2004).

Bist et al., "Adaptive Quantization for Low Bit Rate Video Coding," Proc. 1998 Int'l Conf. on Image Processing (ICIP 98), pp. 925-928 (Oct. 1998).

Calderbank et al., "Wavelet transforms that map integers to integers," Mathematics Subject Classification, Aug. 1996, 39 pages.

Chang et al., "Adaptive Wavelet Thresholding for Image Denoising and Compression," IEEE Trans on Image Processing, vol. 9, No. 9, pp. 1532-1546 (Sep. 2000).

Chrysafis et al., "Context-based Adaptive Image Coding," Proc. of the 30th Asilomar Conf. on Signals, Systems, and Computers, 5 pp. (Nov. 1996).

De Simone, et al., "A comparative study of JPEG 2000, AVC/H.264, and HD Photo," SPIE Optics and Photonics, Applications of Digital Image Processing XXX, 12 pp. (Aug. 2007).

Donoho et al., "Data compression and Harmonic Analysis," IEEE transaction on information theory, vol. 44, No. 6, Oct. 1998, pp. 2435-2476.

Farvardin et al., "Optimum quantizer performance for a class of non-Gaussian memoryless sources," IEEE Trans. Inform. Theory, vol. IT-30, No. 3, pp. 485-497 (May 1984).

Flierl et al., "A Video Codec Incorporating Block-Based Multi-Hypothesis Motion-Compensated Prediction," in Proceedings of the SPIE Conference on Visual Communications and Image Processing, Perth, Australia, vol. 4067, pp. 238-249 (Jun. 2000).

Flierl et al., "Generalized B Pictures and the Draft H.264/AVC Video Compression Standard," in IEEE Transactions on Circuits and Systems for Video Technology, vol. 13, No. 7, pp. 587-597 (Jul. 2003).

Foos et al., "JPEG 2000 compression of medical imagery," Proc. SPIE, vol. 3980, pp. 85-96 (Feb. 2000).

Garrigues et al., "Atom position coding in a matching pursuit based video coder," Lecture Notes in Computer Science, 4 pp. (Sep. 2005).

Gavrilescu et al., "Embedded Multiple Description Scalar Quantizers," IEE Electronics Letters, vol. 39, No. 13, 12 pp. (Jun. 2003).

Gish et al., "Asymptotically efficient quantizing," IEEE Trans. Inform. Theory, vol. IT-14, No. 5 (Sep. 1968).

Golner et al., "Region Based Variable Quantization for JPEG Image Compression," IEEE Symp. on Circuits and Systems, pp. 604-607 (Aug. 2000).

Golston et al., "Video codecs tutorial: Trade-offs with H.264, VC-1 and other advanced codecs," Video/Imaging Design Line, 9 pp. (Mar. 2006).

"H.264 & IPTV Over DSL—Enabling New Telco Revenue Opportunities," White Paper, 12 pp. (May 15, 2004).

Hannuksela et al., "Sub-picture: ROI coding and unequal error protection," Proc. 2002 Int'l Conf. on Image Processing, vol. 3, Issue 24-28, pp. 537-540 (Jun. 2002).

Impoco, "JPEG2000—a Short Tutorial," 16 pp. (2004).

International Search Report of the International Searching Authority, mailed Nov. 1, 2007, for International Patent Application No. PCT/US2007/010848.

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).

"ISO/IEC 13818-2. Generic coding of moving pictures and associated audio information," MPEG (Moving Pictures Expert Group), International Organization for Standardization, MPEG2 Video, 23 pp. (Dec. 2000).

ISO/IEC, "14496-2: Information Technology—Coding of Audio-Visual Objects—Part 2: Visual," 724 pp. (Jun. 2004).

ISO/IEC, "10918-1: CCITT Recommendation T.81: Digital Compression and Coding of Continuous Tone Still Images," pp. 337-547 (1992).

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "ITU-T Recommendation H.261: Video Codec for Audiovisual Services at p x 64 kbits," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

(56) References Cited

OTHER PUBLICATIONS

ITU-T, "CCITT Recommendation T.81: Information Technology—Digital Compression and Coding of Continuous-Tone Still Images—Requirements and Guidelines," 190 pp. (Sep. 1992).
ITU-T, "ITU-T Recommendation T.84: Terminals for Telematic Services—Information Technology—Digital Compression and Coding of Continuous-Tone Still Images: Extensions," 84 pp. (Jul. 1996).
ITU-T, "ITU-T Recommendation T.800: JPEG 2000 Image Coding System: Core Coding System," 212 pp. (2002).
ITU-T, "ITU-T Recommendation T.801: JPEG 2000 image coding system: Extensions," 334 pp. (Aug. 2002).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Joshi et al., "Comparison of generalized Gaussian and Laplacian modeling in DCT image coding," IEEE Signal Proc. Letters, vol. SPL-2, No. 5, pp. 81-82 (May 1995).
Kim et al., "Still image coding based on vector quantization and fractal approximation," IEEE Transactions on Image Processing, vol. 5, No. 4, pp. 587-597 (Apr. 1996).
Kingsbury, "Use of Laplacian PDFs in Image Compression," 5 pp. (2003).
Kopp, "Lossless Wavelet Based Image Compression with Adaptive 2D Decomposition," Proc. 4th Int'l Conf. in Central Europe on Computer Graphics and Visualization 96, pp. 141-149 (Feb. 12-16, 1996).
Lam et al., "A mathematical analysis of the DCT coefficient distributions for images," IEEE Trans. Image Proc., vol. IP-9, No. 10, pp. 1661-1666 (Oct. 2000).
LeGall, "MPEG: A Video Compression Standard for Multimedia Application," Communications of the ACM, vol. 34, No. 4, pp. 47-58 (Apr. 1991).
LeGall, "The MPEG Video Compression Algorithm," Signal Processing: Image Communication 4, vol. 4, No. 2, pp. 129-140 (Apr. 1992).
LeGall et al., "Transmission of HDTV signals under 140 Mbit/s using a subband decomposition and Discrete Cosine Transform coding," in Signal Processing of HDTV, Elsevier, Amsterdam, pp. 287-293 (Oct. 1988).
Lei et al., "Rate Adaptation Transcoding for Precoded Video Streams," 13 pp. (month unknown, 2000).
Limb, "A Picture-Coding Algorithm for the Merli Scan," IEEE Transactions on Communications, pp. 300-305 (Apr. 1973).
Lin et al, "Low-complexity face-assisted coding scheme for low bit rate video telephony," IEICE Trans. Inf. & Sys., vol. E86-D, No. 1, pp. 101-108 (Jan. 2003).
Lin et al, "Low-complexity face-assisted video coding," Proc. 2000 Int'l Conf. on Image Processing, vol. 2, pp. 207-210 (Sep. 2000).
Lloyd, "Least squares quantization in PCM," IEEE Trans. Inform. Theory, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 13 pp. (Document dated Apr. 2006) [Downloaded from the World Wide Web on May 31, 2007].
Lopresto et al., "Image Coding Based on Mixture Modeling of Wavelet Coefficients and a Fast Estimation-Quantization Framework," Proc. IEEE Data Compression Conference, (Snowbird, UT), pp. 221-230 (Mar. 1997).
Luo et al., "A Scene Adaptive and Signal Adaptive Quantization for Subband Image and Video Compression Using Wavelets," IEEE Trans. on Circuits and Systems for Video Tech., vol. 7, No. 2, pp. 343-357 (Apr. 1997).
Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.
Mallat, "A theory for multiresolution signal decomposition: the wavelet representation," IEEE Trans. Pattern Anal. and Machine Intell., vol. PAMI-11, No. 7, pp. 674-692 (Jul. 1989).
Man et al., "Three-Dimensional Subband Coding Techniques for Wireless Video Communications," IEEE Trans. on Circuits and Systems for Video Technology, vol. 12, No. 6, pp. 386-397 (Jun. 2002).
Marcellin et al., "An Overview of JPEG-2000," IEEE Data Compression Conference, 19 pp. (2000).
Marcellin et al., "An overview of quantization in JPEG 2000," Signal Processing: Image Communication, vol. 17, pp. 73-84 (Jan. 2002).
Masala et al., "Perceptually Optimized MPEG Compression of Synthetic Video Sequences," Proc. ICIP, pp. I-601-I-604 (Sep. 2005).
Max, "Quantizing for minimum distortion," IEEE Trans. Inform. Theory, vol. IT-6, No. 1, pp. 7-12 (Mar. 1960).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mitra et al., "Two-Stage Color Palettization for Error Diffusion," Proceedings of SPIE, pp. 207-217 (Jun. 2002).
Mook, "Next-Gen Windows Media Player Leaks to the Web," BetaNews, 17 pp. (Jul. 19, 2002) [Downloaded from the World Wide Web on Aug. 8, 2003].
Muller, "Distribution shape of two-dimensional DCT coefficients of natural images," IEE Electronics Letters, vol. 29, No. 22 (Oct. 1993).
Murakami et al., "Comparison between DPCM and Hadamard transform coding in the composite coding of the NTSC color TV signal," IEEE Trans. on Commun., vol. COM-30, No. 3, pp. 469-479 (Mar. 1982).
Musmann et al., "Advances in Picture Coding," Proceedings of the IEEE, vol. 73, No. 4, pp. 523-548 (Apr. 1985).
Neff et al., "Modulus Quantization for Matching Pursuit Video Coding," IEEE Transactions on Circuits and Systems for Video Technology, vol. 10, No. 6, pp. 895-912 (Sep. 2000).
Nguyen et al., "Set Theoretic Compression with an Application to Image Coding," IEEE Transactions on Image Processing, vol. 7, No. 7, pp. 1051-1056 (Jul. 1998).
Park et al., "A post processing method for reducing quantization effects in low bit-rate moving picture coding," IEEE Trans. Circuits Syst. Video Technology, vol. 9, pp. 161-171 (Feb. 1999).
Puri et al., "Motion-Compensated Video Coding with Adaptive Perceptual Quantization," IEEE Transactions on Circuits and Systems for Video Technology, vol. 1, No. 4, pp. 351-361 (Dec. 1991).
Radha et al., "The MPEG-4 Fine-Grained Scalable Video Coding Method for Multimedia Streaming Over IP," IEEE Trans. on Multimedia, vol. 3, No. 1, pp. 53-68 (Mar. 2001).
Reininger et al., "Distribution of two-dimensional DCT coefficients for images," IEEE Trans. on Commun., vol. CCOM-31, No. 6, pp. 835-839 (Jun. 1983).
Ribas Corbera et al., "Rate Control in DCT Video Coding for Low-Delay Communications," IEEE Transactions on Circuits and Systems for Video Technology, vol. 9, No. 1, pp. 172-185 (Feb. 1999).
Santa Cruz et al., "An Analytical Study of JPEG 2000 Functionalities" / "JPEG 2000 Still Image Coding Versus Other Standards," Proc. SPIE vol. 4115, 10 pp. (2000).
Schallauer et al., "PRESTO—Preservation Technologies for European Broadcast Archives, D5.4—High Quality Compression for Film and Video," 80 pp. (Sep. 18, 2002).
Schuster et al., "A Theory for the Optimal Bit Allocation Between Displacement Vector Field and Displaced Frame Difference," IEEE J. on Selected Areas in Comm., vol. 15, No. 9, pp. 1739-1751 (Dec. 1997).
Search Report and Written Opinion from PCT/US2007/010848 dated Nov. 1, 2007.
Shanableh et al., "Heterogeneous Video Transcoding to Lower Spatio-Temporal Resolutions and Different Encoding Formats," IEEE Transactions on Multimedia, vol. 2, No. 2, pp. 101-110 (Jun. 2000).
Shen et al., "Rate-Distortion Optimization for Fast Hierarchical B-Picture Transcoding," IEEE, pp. 5279-5282 (May 2006).
Shoushun et al., "Adaptive-Quantization Digital Image Sensor for Low-Power Image Compression," In IEEE Transactions on Circuits and Systems—I: Regular Papers, vol. 54, No. 1, pp. 13-25 (Jan. 2007).
Sony Electronics Inc., "Sony Vizaro DVD Encoder System DVA-V700," 4 pp. (Apr. 2001).

(56) References Cited

OTHER PUBLICATIONS

Srinivasan et al., "HD Photo: A new image coding technology for digital photography," Proc. of SPIE, vol. 6696, 19 pp. (Jan. 2007).

Sullivan, "Efficient scalar quantization of exponential and Laplacian random variables," IEEE Trans. Inform. Theory, vol. IT-42, No. 5, pp. 1365-1374 (Sep. 1996).

Sullivan et al., "Rate-Distortion Optimization for Video Compression," IEEE Signal Processing Magazine, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," IEEE Transactions on Circuits and Systems for Video Tech., vol. 10, No. 1, pp. 147-157 (Feb. 2000).

Taubman et al., "JPEG2000: Image Compression Fundamentals, Standards and Practice," pp. 110-113 and 348-353 (2002).

Taubman et al., "Embedded Block Coding in JPEG2000," 4 pp. (2000).

Tong, "A perceptually adaptive JPEG coder," Thesis, University of Toronto, 124 pp. (1997).

Tsang et al., "Fuzzy Based Rate Control for Real-Time MPEG Video," IEEE Transactions on Fuzzy Systems, pp. 504-516 (Nov. 1998).

Wang, et al., "A Framework for Adaptive Scalable Video Coding Using Wyner-Ziv Techniques," EURASIP Journal on Applied Signal Processing, pp. 1-18 (month unknown, 2006).

Watson, "Perceptual Optimization of DCT Color Quantization Matrices," IEEE Conf. on Image Processing, pp. 100-104 (Nov. 1994).

Watson et al., "Visibility of Wavelet Quantization Noise," IEEE Trans. on Image Processing, vol. 6, No. 8, pp. 1164-1175 (Aug. 1997).

Wien, "Variable Block-Size Transforms for Hybrid Video Coding," Dissertation, 182 pp. (Feb. 2004).

Wu et al., "Context-Based, Adaptive, Lossless Image Coding," IEEE Trans. Communications, vol. 45, pp. 437-444 (Apr. 1997).

Wu et al., "Joint Estimation of Forward and Backward Motion Vectors for Interpolative Prediction of Video," IEEE Transactions on Image Processing, vol. 3, No. 5, pp. 684-687 (Sep. 1994).

Xiong et al., "Wavelet Packet Image Coding Using Space-Frequency Quantization," IEEE Transactions on Image Processing, vol. 7, No. 6, pp. 892-898 (Jun. 1998).

Yang et al., "Rate Control for Videophone Using Local Perceptual Cues," IEEE Transactions on Circuits and Systems for Video Tech., vol. 15, No. 4, pp. 496-507 (Apr. 2005).

Yoo et al., "Adaptive Quantization of Image Subbands with Efficient Overhead Rate Selection," IEEE Conf. on Image Processing, pp. 361-364 (Sep. 1996).

Yuen et al., "A survey of hybrid MC/DPCM/DCT video coding distortions," Signal Processing, vol. 70, pp. 247-278 (Nov. 1998).

Zaid et al., "Wavelet Image Coding with Adaptive Thresholding," 4 pp. (Jul. 2002).

Zhang et al., "Adaptive Field/Frame Selection for High Compression Coding," SPIE Conf. on Image and Video Communications and Processing, 13 pp. (Jan. 2003).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

Eleftheriadis et al., "Dynamic Rate Shaping of Compressed Digital Video," IEEE Transactions on Multimedia, vol. 8, No. 2, Apr. 2006, pp. 297-314.

Lee et al., "Spatio-Temporal Model-Assisted Compatible Coding for Law and Very Low Bitrate Videotelephony," 3rd IEEE International Conference on Image Processing, 4 pages, Sep. 1996.

Richardson, H.264 and MPEG-4 Video Compression, pp. 50-56 and 187-196 (2003).

Sethuraman et al., "Model Based Multi-Pass Macroblock-Level Rate Control for Visually Improved Video Coding," IEEE Proc. of Workshop and Exhibition on MPEG-4, pp. 59-62 (Jun. 2001).

Tong, "Region of Interest (ROI) Based Rate Control for H.236 Compatible Video Conferencing," The University of Texas at Arlington, Ph.D. Thesis, 115 pp. (Dec. 2005).

Wiegand et al., "Joint Draft 10 of SVC Amendment," JVT-W201, 23rd meeting of Joint Video Team, San Jose, CA, sections 7.4.2.2, 7.4.5, 8.5.8, G.7.3.6 and G.7.4.5, 19 pp. (Apr. 2007).

* cited by examiner

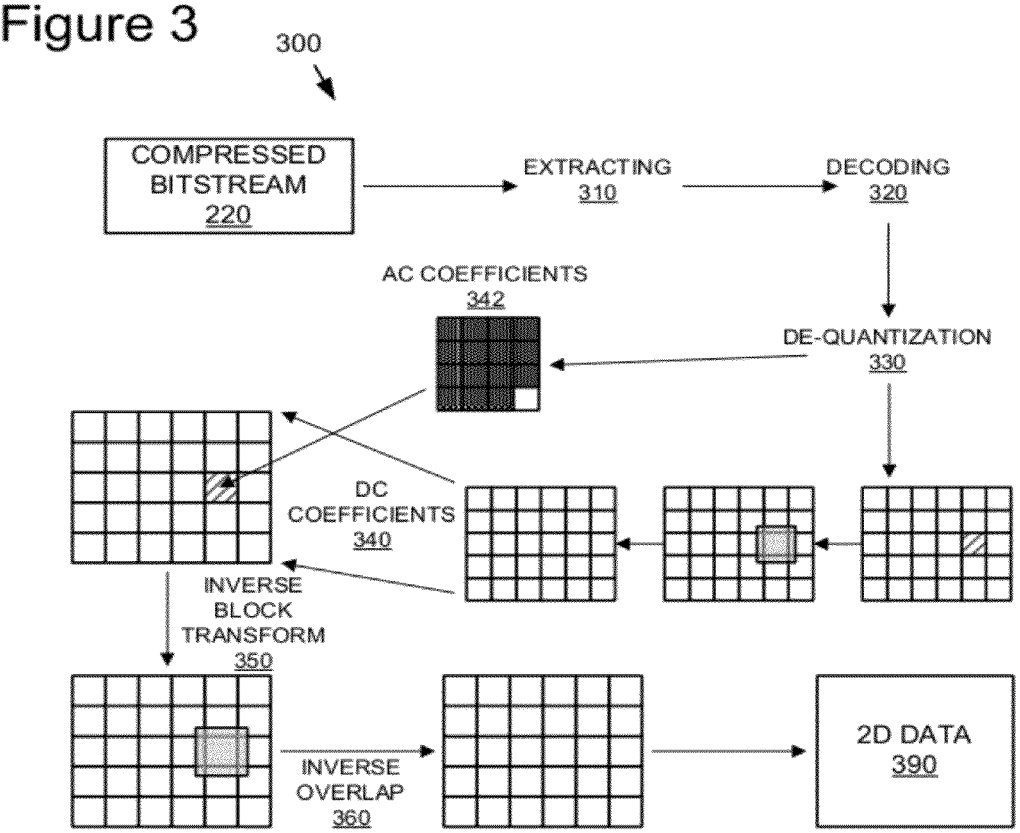

| DC_QUANTIZER () { | Num bits |
|---|---|
| if(CHANNELS == 1) | |
|    DC_CH_MODE = CH_UNIFORM | |
| Else | |
|    DC_CH_MODE | 2 |
| if (DC_CH_MODE == CH_UNIFORM) | |
|    DC_QUANT | 8 |
| Else if (DC_CH_MODE == CH_MIXED) { | |
|    DC_QUANT_Y | 8 |
|    DC_QUANT_UV | 8 |
| } | |
| Else if (DC_CH_MODE == CH_INDEPENDENT) { | |
|    for (i = 0; i < CHANNELS; i++) | |
|      DC_QUANT_CHANNEL_i | 8 |
| } | |
| } | |

| LP_QUANTIZER () { | Num bits |
|---|---|
| for (q = 0; q < LP_QUANTIZERS; q++) { | |
|   if(CHANNELS == 1) | |
|     LP_CHMODE[q] = CH_UNIFORM | |
|   Else | |
|     LP_CH_MODE[q] | 2 |
|   if (LP_CH_MODE[q] == CH_UNIFORM) | |
|     LP_QUANT[q] | 8 |
|   else if (LP_CH_MODE[q] == CH_MIXED) { | |
|     LP_QUANT_Y[q] | 8 |
|     LP_QUANT_UV[q] | 8 |
|   } | |
|   else if (LP_CH_MODE[q] == CH_INDEPENDENT) | |
|     for (i = 0; i < CHANNELS; i++) | |
|       LP_QUANT_CHANNEL_i[q] | 8 |
| } | |
| } | |

| HP_QUANTIZER () { | Num bits |
|---|---|
| for (q = 0; q < HP_QUANTIZERS; q++) { | |
|   if(CHANNELS == 1) | |
|     HP_CH_MODE[q] = CH_UNIFORM | |
|   Else | |
|     HP_CH_MODE[q] | 2 |
|   if (HP_CH_MODE[q] == CH_UNIFORM) | |
|     HP_QUANT[q] | 8 |
|   else if (LP_CH_MODE[q] == CH_MIXED) { | |
|     HP_QUANT_Y[q] | 8 |
|     HP_QUANT_UV[q] | 8 |
|   } | |
|   else if (HP_CH_MODE[q] == CH_INDEPENDENT) | |
|     for (i = 0; i < CHANNELS; i++) | |
|       HP_QUANT_CHANNEL_i[q] | 8 |
| } | |
| } | |

| FRAME () { | Num bits |
|---|---|
| ... | lots |
| DC_FRAME_UNIFORM | 1 |
| if (DC_FRAME_UNIFORM) | |
|   DC_QUANTIZER | variable |
| if('lowpass not skipped'){ | |
|   USE_DC_QUANTIZER | 1 |
|   if(USE_DC_QUANTIZER == FALSE){ | |
|     LP_FRAME_UNIFORM | 1 |
|     If(LP_FRAME_UNIFORM){ | |
|       LP_QUANTIZERS = 1 | |
|       LP_QUANTIZER() | variable |
|     } | |
|   } | |
| } | |
| if('highpass not skipped'){ | |
|   USE_LP_QUANTIZER | 1 |
|   if(USE_LP_QUANTIZER == FALSE){ | |
|     HP_FRAME_UNIFORM | 1 |
|     If(HP_FRAME_UNIFORM){ | |
|       HP_QUANTIZERS = 1 | |
|       HP_QUANTIZER() | variable |
|     } | |
|   } | |
| } | |
| } | |

| SPATIAL_TILE () { | Num bits |
|---|---|
| ... | lots |
| if (DC_FRAME_UNIFORM == FALSE) | |
|   DC_QUANTIZER | variable |
| if ('lowpass not skipped' && | |
| LP_FRAME_UNIFORM == FALSE) { | |
|   USE_DC_QUANTIZER | 1 |
|   If(USE_DC_QUANTIZER == FALSE) | |
|     LP_QUANTIZERS | 4 |
|     LP_QUANTIZER | variable |
| } | |
| if('higpass not skipped' && | |
| HP_FRAME_UNIFORM){ | |
|   USE_LP_QUANTIZER | 1 |
|   If(USE_LP_QUANTIZER == FALSE) | |
|     HP_QUANTIZERS | 4 |
|     HP_QUANTIZER | variable |
| } | |
| ... | lots |
| } | |

| DC_TILE () { | Num bits |
|---|---|
| ... | lots |
| if (DC_FRAME_UNIFORM == FALSE) { | |
|   DC_QUANTIZER | variable |
| } | |
| ... | lots |
| } | |

| LP_TILE () { | Num bits |
|---|---|
| ... | lots |
| if (LP_FRAME_UNIFORM == FALSE) { | |
|   USE_DC_QUANTIZER | 1 |
|   if(USE_DC_QUANTIZER == FALSE) | |
|     LP_QUANTIZERS | 4 |
|     LP_QUANTIZER | Variable |
| } | |
| ... | Lots |
| } | |

| HP_TILE () { | Num bits |
|---|---|
| ... | Lots |
|   if (HP_FRAME_UNIFORM == FALSE) { | |
|     USE_LP_QUANTIZER | 1 |
|     if(USE_LP_QUANTIZER == FALSE) | |
|       HP_QUANTIZERS | 4 |
|       HP_QUANTIZER | Variable |
|   } | |
| ... | Lots |
| } | |

| SPATIAL_MB () { | Num bits |
|---|---|
|   if ('lowpass not skipped' && LP_QUANTIZERS > 1 && USE_DC_QUANTIZER == FALSE) | |
|     LP_QUANTIZER_INDEX | Variable |
|   if('higpass not skipped' && HP_QUANTIZERS > 1 && USE_HP_QUANTIZER == FALSE) | |
|     HP_QUANTIZER_INDEX | Variable |
| ... | Lots |
| } | |

| LP_MB () { | Num bits |
|---|---|
| ... | Lots |
|   if (LP_QUANTIZERS > 1 && USE_DC_QUANTIZER == FALSE) | |
|     LP_QUANTIZER_INDEX | Variable |
| ... | Lots |
| } | |

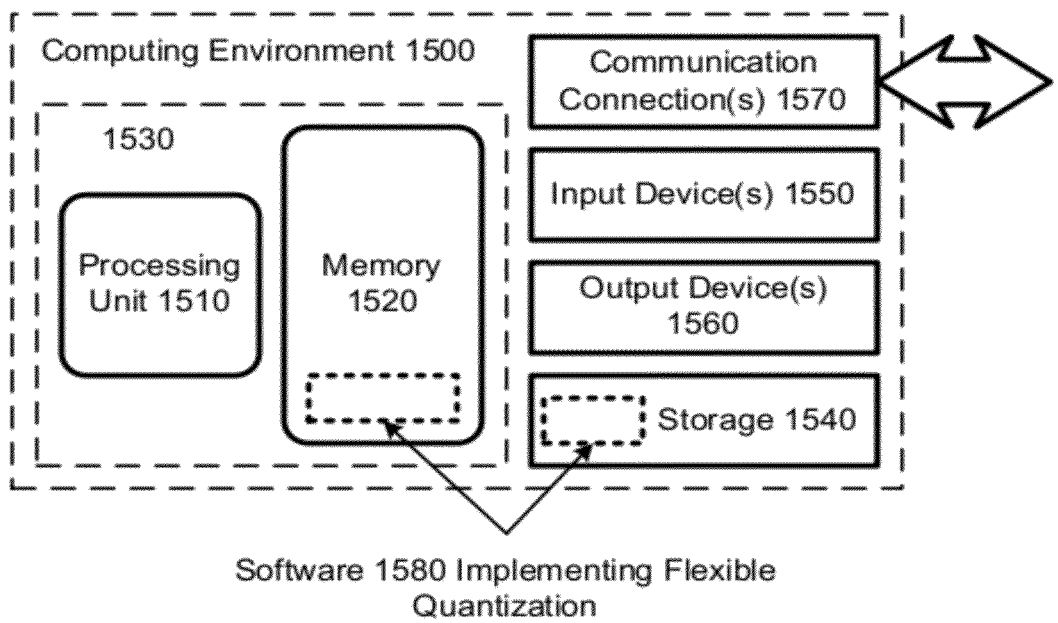

HARMONIC QUANTIZER SCALE

CROSS-REFERENCE TO RELATED APPLICATIONS

This is a continuation of U.S. patent application Ser. No. 11/676,263, filed Feb. 16, 2007, which is a continuation-in-part of Tu et al., "Flexible Quantization," U.S. patent application Ser. No. 11/418,690, filed May 5, 2006, both of which are herein incorporated by reference.

BACKGROUND

1. Block Transform-Based Coding

Transform coding is a compression technique used in many digital media (e.g., audio, image and video) compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based encoder/decoder system 100 (also called a "codec") shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=M x, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns). However, non-separable block transforms also can be used in codecs for multi-dimension digital media.

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

2. Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, with or without dead zone, and adaptive or non-adaptive quantization.

The quantization operation is essentially a biased division by a quantization parameter QP which is performed at the encoder. The inverse quantization or multiplication operation is a multiplication by QP performed at the decoder. These processes together introduce a loss in the original transform coefficient data, which shows up as compression errors or artifacts in the decoded image.

Quantization is the primary mechanism for most image and video codecs to control compressed image quality and compression ratio. Quantization methods supported by most popular codecs fail to provide an adequate range of control over quality and coded bitrate. Popular codecs generally permit only certain discrete values of QP to be coded in the bitstream.

Several issues are involved in the design of the quantizer and dequantizer, including the specific quantization rule, variation of quantizers across frequency bands, signaling of quantizers and choice of the quantization parameter.

SUMMARY

The following Detailed Description presents variations of a harmonic quantization scale technique that provides the ability to finely control quantization over the range of bitrates supported by the codec, in such way that the quantization also is efficiently signaled in the bitstream and computationally efficient for the decoder.

According to one implementation of the technique, a digital media codec permits choice of the quantization parameter from a harmonic scale. The term "harmonic" is used to denote a sequence of values in which successive values are related as simple fractions of each other. This has the benefit of providing a wide range of permissible values of the quantization parameter, while also having a relatively even control of bitrate and quality across the range. Further, the choice of quantization parameter from the harmonic scale can be efficiently signaled using a quantization index, which may be a fixed length value. In some implementations, a flexible variation of the quantization parameter over separate partitions of the digital media within the bitstream (e.g., different quantization parameters applied to separate sub-bands and channels of an image) can be signaled by defining a table of quantization indices at a suitable hierarchical level of the bitstream syntax, and referencing the quantization index out of the table with a coded symbol to signal the quantization parameter applied to a portion of the digital media.

According to a further aspect of the technique, the harmonic quantization scale further permits contrast adjustment of digital media (e.g., image data) in the compressed domain, including when variable quantization has been applied across the digital media. The contrast is adjusted in the compressed domain by uniformly adjusting the quantization indices across the digital media.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

BRIEF DESCRIPTION OF THE DRAWINGS

FIG. 3 is a flow diagram of a representative decoder incorporating the block pattern coding.

FIG. 4 is a table containing a pseudo-code definition for signaling of a DC quantizer according to a flexible quantization technique.

FIG. 5 is a table containing a pseudo-code definition for signaling of a low-pass quantizer according to the flexible quantization technique.

FIG. 6 is a table containing a pseudo-code definition for signaling of a high-pass quantizer according to the flexible quantization technique.

FIG. 7 is a table containing a pseudo-code definition for signaling of quantizers at a frame layer according to the flexible quantization technique.

FIG. 8 is a table containing a pseudo-code definition for signaling of quantizers at a tile layer in spatial mode according to the flexible quantization technique.

FIG. 9 is a table containing a pseudo-code definition for signaling of quantizers of a DC sub-band at the tile layer in frequency mode according to the flexible quantization technique.

FIG. 10 is a table containing a pseudo-code definition for signaling of quantizers of a low-pass sub-band at the tile layer in frequency mode according to the flexible quantization technique.

FIG. 11 is a table containing a pseudo-code definition for signaling of quantizers of a high-pass sub-band at the tile layer in frequency mode according to the flexible quantization technique.

FIG. 12 is a table containing a pseudo-code definition for signaling of quantizers at a macroblock layer in spatial mode according to the flexible quantization technique.

FIG. 13 is a table containing a pseudo-code definition for signaling of low-pass quantizers at the macroblock layer in frequency mode according to the flexible quantization technique.

FIG. 14 is a table containing a pseudo-code definition for signaling of high-pass quantizers at the macroblock layer in frequency mode according to the flexible quantization technique.

FIG. 15 is a block diagram of a suitable computing environment for implementing a media encoder/decoder with flexible quantization.

DETAILED DESCRIPTION

The following description relates to coding and decoding techniques that define a scale or rule governing the permissible values of the quantization parameter used in a digital media codec. The described quantizer scale technique is referred to herein as a "harmonic quantizer scale." The following description describes an example implementation of the technique in the context of a digital media compression system or codec. The digital media system codes digital media data in a compressed form for transmission or storage, and decodes the data for playback or other processing. For purposes of illustration, this exemplary compression system incorporating this harmonic quantization scale is an image or video compression system. Alternatively, the technique also can be incorporated into compression systems or codecs for other digital media data. The flexible quantization technique does not require that the digital media compression system encodes the compressed digital media data in a particular coding format.

1. Encoder/Decoder

Figure 1:
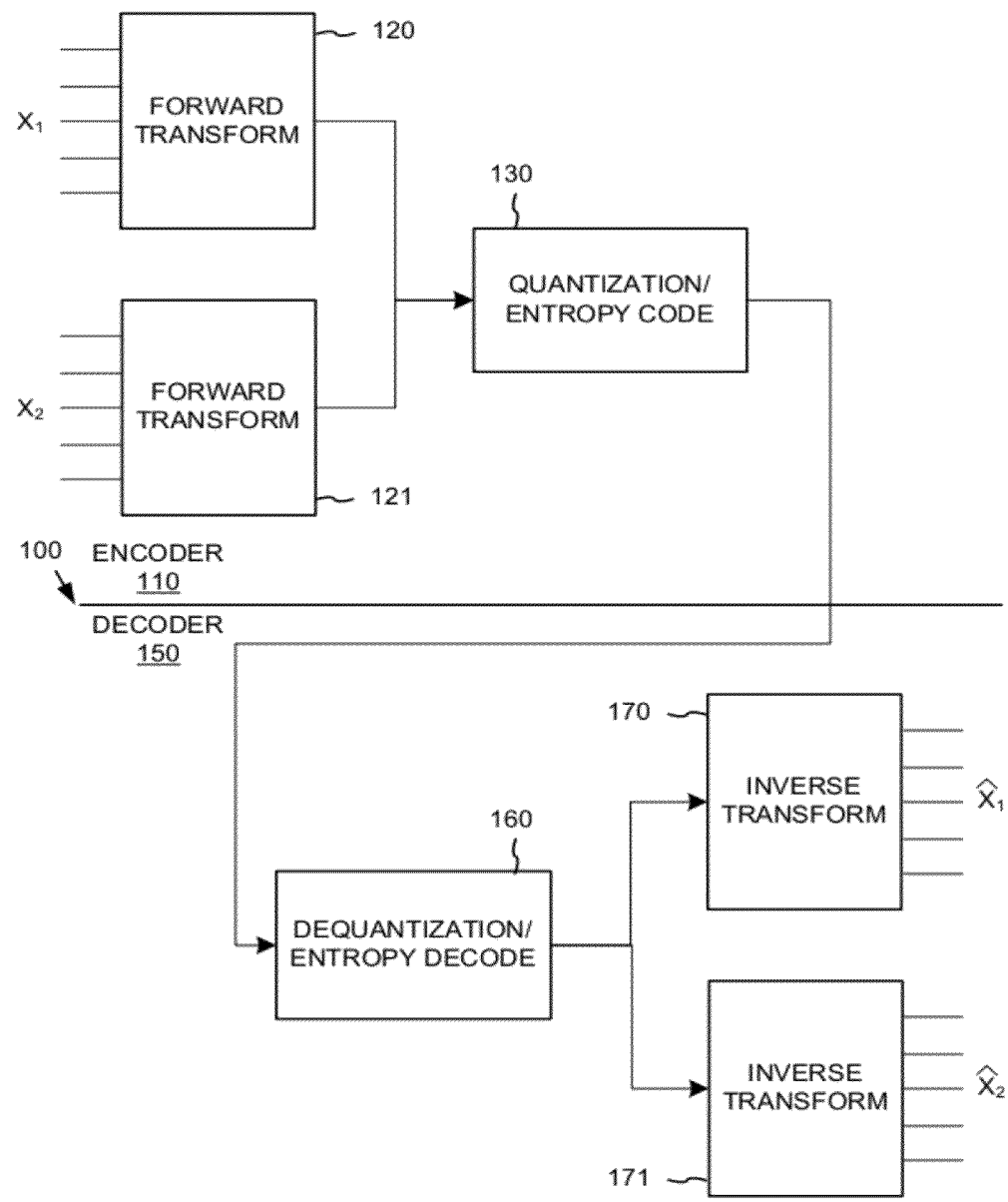
FIG. 1 is a block diagram of a conventional block transform-based codec in the prior art.
Figure 2:
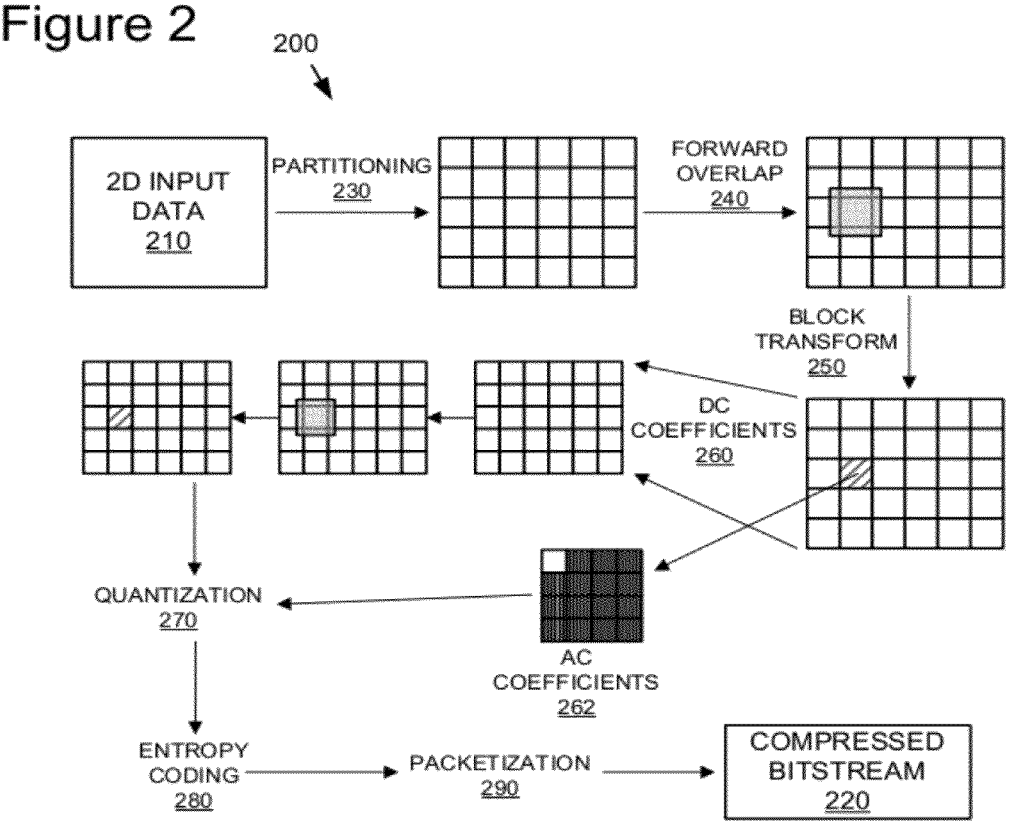
FIG. 2 is a flow diagram of a representative encoder incorporating the block pattern coding.

FIGS. 2 and 3 are a generalized diagram of the processes employed in a representative 2-dimensional (2D) data encoder 200 and decoder 300. The diagrams present a generalized or simplified illustration of a compression system incorporating the 2D data encoder and decoder that implement compression using the harmonic quantizer scale. In alternative compression systems using the harmonic quantizer scale, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 200 produces a compressed bitstream 220 that is a more compact representation (for typical input) of 2D data 210 presented as input to the encoder. For example, the 2D data input can be an image, a frame of a video sequence, or other data having two dimensions. The 2D data encoder divides a frame of the input data into blocks (illustrated generally in FIG. 2 as partitioning 230), which in the illustrated implementation are non-overlapping 4×4 pixel blocks that form a regular pattern across the plane of the frame. These blocks are grouped in clusters, called macroblocks, which are 16×16 pixels in size in this representative encoder. In turn, the macroblocks are grouped into regular structures called tiles. The tiles also form a regular pattern over the image, such that tiles in a horizontal row are of uniform height and aligned, and tiles in a vertical column are of uniform width and aligned. In the representative encoder, the tiles can be any arbitrary size that is a multiple of 16 in the horizontal and/or vertical direction. Alternative encoder implementations can divide the image into block, macroblock, tiles, or other units of other size and structure.

A "forward overlap" operator 240 is applied to each edge between blocks, after which each 4×4 block is transformed using a block transform 250. This block transform 250 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004. The overlap operator 240 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 260 of each 4×4 transform block is subject to a similar processing chain (tiling, forward overlap, followed by 4×4 block transform). The resulting DC transform coefficients and the AC transform coefficients are quantized 270, entropy coded 280 and packetized 290.

The decoder performs the reverse process. On the decoder side, the transform coefficient bits are extracted 310 from their respective packets, from which the coefficients are themselves decoded 320 and dequantized 330. The DC coefficients 340 are regenerated by applying an inverse transform, and the plane of DC coefficients is "inverse overlapped" using a suitable smoothing operator applied across the DC block edges. Subsequently, the entire data is regenerated by applying the 4×4 inverse transform 350 to the DC coefficients, and the AC coefficients 342 decoded from the bitstream. Finally, the block edges in the resulting image planes are inverse overlap filtered 360. This produces a reconstructed 2D data output.

In an exemplary implementation, the encoder 200 (FIG. 2) compresses an input image into the compressed bitstream 220 (e.g., a file), and the decoder 300 (FIG. 3) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 210 compressed by the illustrated encoder 200/decoder 300 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 200 tiles the input image or picture into macroblocks. In an exemplary implementation, the encoder 200 tiles the input image into 16×16 pixel areas (called "macroblocks") in the Y channel (which may be 16×16, 16×8 or 8×8 areas in the U and V channels depending on the color format). Each macroblock color plane is tiled into 4×4 pixel regions or blocks. Therefore, a macroblock is composed for the various color formats in the following manner for this exemplary encoder implementation:

1. For a grayscale image, each macroblock contains 16 4×4 luminance (Y) blocks.
2. For a YUV4:2:0 format color image, each macroblock contains 16 4×4 Y blocks, and 4 each 4×4 chrominance (U and V) blocks.
3. For a YUV4:2:2 format color image, each macroblock contains 16 4×4 Y blocks, and 8 each 4×4 chrominance (U and V) blocks.
4. For a RGB or YUV4:4:4 color image, each macroblock contains 16 blocks each of Y, U and V channels.

Accordingly, after transform, a macroblock in this representative encoder 200/decoder 300 has three frequency sub bands: a DC sub band (DC macroblock), a low pass sub band (low pass macroblock), and a high pass sub band (high pass macroblock). In the representative system, the low pass and/or high pass sub bands are optional in the bitstream—these sub bands may be entirely dropped.

Further, the compressed data can be packed into the bitstream in one of two orderings: spatial order and frequency order. For the spatial order, different sub bands of the same macroblock within a tile are ordered together, and the resulting bitstream of each tile is written into one packet. For the frequency order, the same sub band from different macroblocks within a tile are grouped together, and thus the bitstream of a tile is written into three packets: a DC tile packet, a low pass tile packet, and a high pass tile packet. In addition, there may be other data layers.

Thus, for the representative system, an image is organized in the following "dimensions":

Spatial dimension:Frame→Tile→Macroblock;
Frequency dimension:DC|Low pass|High pass; and
Channel dimension:Luminance|Chrominance_0|Chrominance_1 . . . (e.g. as Y|U|V).

The arrows above denote a hierarchy, whereas the vertical bars denote a partitioning.

Although the representative system organizes the compressed digital media data in spatial, frequency and channel dimensions, the flexible quantization approach described here can be applied in alternative encoder/decoder systems that organize their data along fewer, additional or other dimensions. For example, the flexible quantization approach can be applied to coding using a larger number of frequency bands, other format of color channels (e.g., YIQ, RGB, etc.), additional image channels (e.g., for stereo vision or other multiple camera arrays).

2. Desired Quantizer Scale Properties

The quantizer scale of a codec is a rule that governs the range of permissible choices for the quantization parameter (QP). Generally, only certain discrete values for the quantization parameters are allowed to be signaled in the compressed bitstream. The scale or range of permitted values of the QP for a codec desirably would have the following properties: (1) provides fine and meaningful control of quality and coded bitrate; (2) addresses the entire range of desired quality levels; (3) addresses the entire range of bit depths encountered; (4) is bit-efficient for signaling in the compressed bitstream; and (5) is computationally efficient, particularly in the dequantization process.

With respect to the first property, the range of permissible values for QP should have a sufficiently fine granularity such that any arbitrary bitrate (R) can be achieved to within a reasonably good degree of approximation (i.e., to within reasonable bounds). For example, the reasonable bounds might be that there exists a permissible quantization parameter in the scale that results in a coded bitrate no more than 10% from a desired target bitrate, across the entire range of bitrates supported by the encoder and digital media data. In other practical examples of reasonable bounds, if it is desired for an image to be stored in 1 MB of memory, there should be some quantization parameter in the scale that can compress the image between a desired reasonable bounds, such as 0.9 to 1.1 MB. Likewise, if it is desired that the peak signal to noise ratio (PSNR) of the compressed frame be 40 dB, then the scale should include some quantization parameter to produce a PSNR within a desired reasonable bound (e.g., 39.8 dB to 40.2 dB).

As for the second property, the QP should span a wide range of quality levels. A QP=1 should be permitted for a codec to allow lossless encoding of data. Sometimes, a QP<1 also may be necessary for certain codecs that do not use an invertible transform. On the other extreme, large QPs may be needed to allow for maximum compression (translating to lowest acceptable quality of signal). This problem is exacerbated by the range of data itself being large. For instance, image data may span anywhere between 1 bit per pixel channel, all the way to 16 bits per pixel channel, and more. In one extreme, QP=1 is required for lossless encoding. In the other extreme, QP>10000 may be desired to encode 16 bit per pixel channel data at a very low quality.

The above two properties could be met using a quantization scale that spans a large interval of integers or fractions. For instance, a 16 bit wide quantizer may be defined with 14 significant bits and 4 fractional bits. This 16 bit wide quantizer scale provides adequate flexibility across bitrates and quality/bitdepth levels. However, such quantizer scale is overkill in practice because the gradation would be overly fine at high QP values. For instance, there is practically no difference between the quantizer values: 10000.0, 10000.25 and 10000.5, or even 10100. The 16 bit wide quantizer scale design therefore would lead to redundancies in the signaling of QP.

However, a more severe issue than the signaling redundancy for the 16 bit wide quantizer design is that such fine quantizer scales are inefficient from a computational standpoint. The decoder implements dequantization, which as mentioned earlier, is essentially a multiplication step. For computational efficiency, it is desirable to keep the number of significant digits small in multiplication operations. For example, if a quantizer value of about 10000 is chosen to achieve a desired quality or bitrate, setting the QP instead to 0x2700 (equal to 9984) would reduce the significant bits to less than 8. If the next permissible QP choice on the scale were defined as 0x2800 (equal to 10240), it would be a meaningful yet fine step up from 0x2700. As compared to the 16 bit wide quantizer scale, the computational efficiency would be improved while also achieving the fine control over quality and bitrate property.

3. Harmonic Quantizer Scale

The above properties can be achieved through use of a harmonic quantizer scale. The term "harmonic" is used to denote the fact that quantizers in the scale are simple fractions of each other. In other words, the scale is a sequence of permissible QP values, where values in the scale are all related as simple fractions of each other.

In one example implementation of a harmonic quantizer scale, the scale of permissible QP values for a codec (e.g., the representative codec 200, 300 (FIGS. 2 and 3)) is defined by the following formula or rule:

$$QP_i = i \qquad \text{for } 1 \leq i \leq 15 \qquad (1)$$
$$= ((i \bmod 16) + 16) \cdot 2^{\lfloor \frac{i-16}{16} \rfloor} \quad \text{otherwise}$$

This formula meets the definition herein of a harmonic scale. It can be seen that if a certain QP=q is in the scale, then the scale also includes QP=2q (within the limits of a maximum limit of QP allowed for the codec implementation). Likewise, QP=q/2 also is in the scale (for q>31).

Due to the term $$2^{\lfloor \frac{i-16}{16} \rfloor}$$

in the formula (1) defining the harmonic quantizer scale, the harmonic quantizer scale has the benefit of permitting a wide range of values for QP. Further, the harmonic scale provides a relatively even degree of rate and quality control across the entire range of permitted QP values. Due to the simplicity of the mantissa term (i.e., ((i mod 16)+16)) in the formula (1), the dequantization process is simply a multiplication by an integer between 16 and 31. The number of significant digits is minimized as compared to codec that use a logarithmic or geometric quantizer scale. Yet, with 16 discrete indices per octave of the harmonic scale, the formula provides a high degree of resolution.

In one exemplary codec implementing a harmonic quantizer scale based on this formula, the index value i is an integer ranging from 1 to as high as an upper limit of 240, which upper limit is chosen to provide control of quality and bitrate across the dynamic range of digital media data supported by the codec. More generally, the rule (1) defining the harmonic quantizer scale can be extended for alternative codec implementations to support a wider dynamic range data by allowing a larger range of the index i, including values less than 1 and over 240. The rule also can be extended for other codec implementations to permit different quality gradations by changing the periodicity of the mantissa in the formula. For instance, the mantissa may take on one of 32 values (as opposed to 1 of 16 defined in the formula (1)), or alternatively 1 in 12 or other number ratio. The exponents may be allowed to vary on the negative side as well, either obviating the denormal rule or moving it to a different part of the domain.

Figure 16:
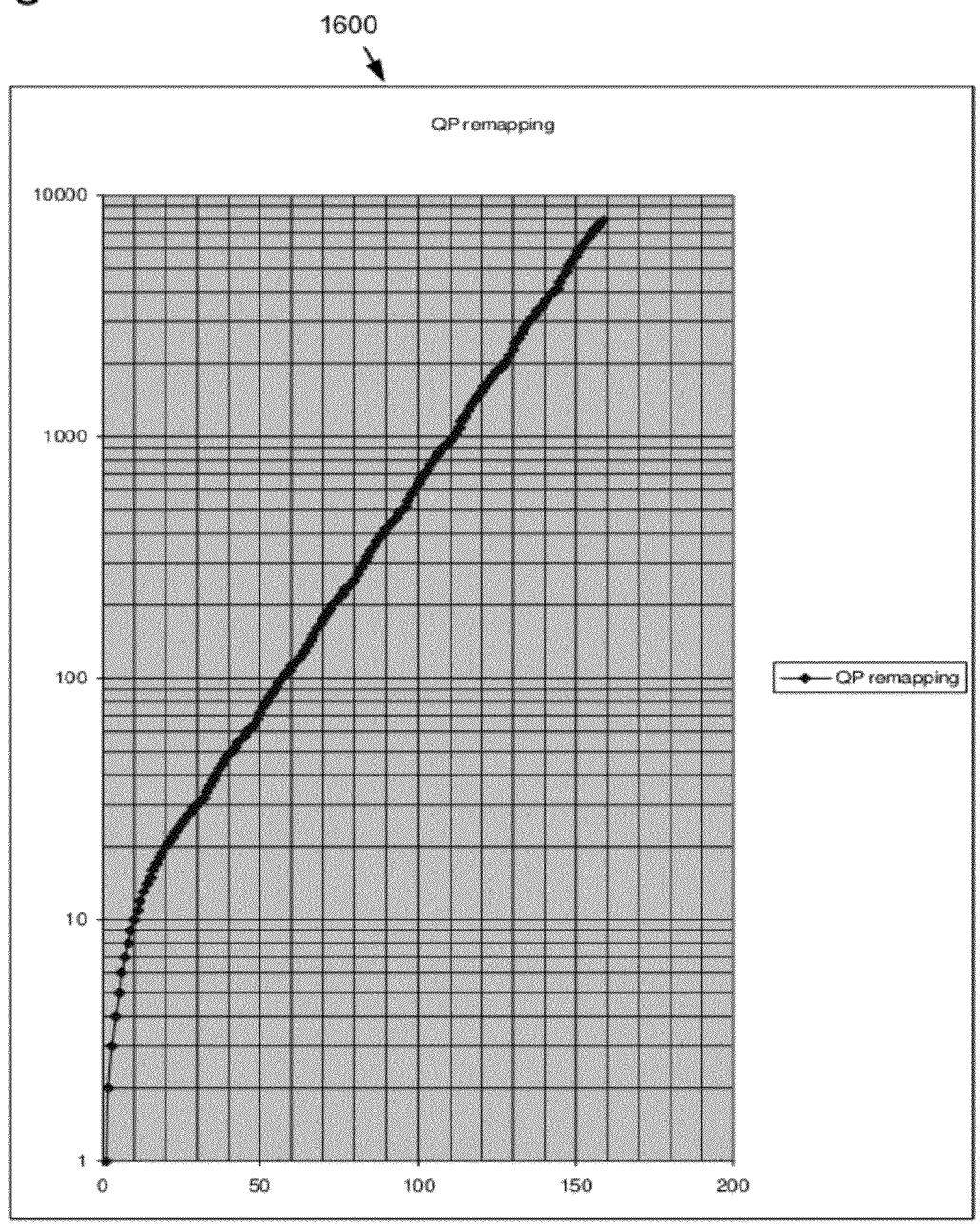
FIG. 16 is a graph illustrating the variation of the quantization parameter (QP) relative to quantization index (i) for the harmonic quantizer scale.

With reference to FIG. 16, a graph 1600 shows the variation of the quantization parameter $QP_i$ with the index i over a range up to i=160. It can be seen that the graph of the QP over the harmonic scale is close to logarithmic, yet not exactly so. The harmonic quantization scale as defined by the formula (1) above guarantees two successive QP values to be at a ratio no greater than 17/16=1.0625. This is nearly twice as fine control of rate/distortion compared to a logarithmic scale with six steps per octave that guarantees successive QP values are at a ratio of $2^{1/6} \approx 1.1225$ (since 1.0625 is nearly the square root of 1.12).

4. Fractional QP Values and Scaled Arithmetic

The harmonic quantization scale also can be varied to permit fractional or scaled arithmetic. The representative codec 200, 300 defines two modes of quantization/dequantization operations—non-scaled and scaled. In the non-scaled mode, the harmonic quantizer scale defined in formula (1) is used. In the scaled mode of operation, QP is defined to be ¼ of the rule defined by formula (1). In other words, the quantizer has two fractional bits. The max limit of the range of QP is reduced to 0x10000, but the scaled mode allows for finer QP adjustment at the low values. This is desirable for lossy encoding where the transform itself uses scaled or fixed point arithmetic for reducing the rounding error.

The mode of operation (non-scaled or scaled) is indicated with a bit in the bitstream (called the "no scaled flag"), which is sent in the header at the image plane of the compressed bitstream. This bit also indicates whether the transform uses non-scaled (purely integer) or scaled (fixed point integer) arithmetic.

5. Flexible Quantization

In the representative encoder/decoder, various quantization parameters (QP) chosen from the harmonic quantizer scale can be applied to separate partitions across the digital media using a flexible quantization technique.

As discussed above, the quantization operation is essentially a biased division by a quantization parameter QP which is performed at the encoder. The inverse quantization or multiplication operation is a multiplication by QP performed at the decoder. However, alternative implementations of the flexible quantization described herein can utilize other forms of quantization, including uniform and non-uniform, scalar or vector, with or without dead zone, etc. The quantization/inverse quantization processes together introduce a loss in the original transform coefficient data, which shows up as compression errors or artifacts in the decoded image. In a simplistic codec, a certain fixed value of QP can be applied to all transform coefficients in a frame. While this may be an acceptable solution in some cases, it has several deficiencies:

The human visual system is not equally sensitive to all frequencies, or to all spatial locations within a frame, or to all luminance and chrominance channels. Using different QP values for different coefficients may provide a visually superior encoding even with the same or smaller number of compressed bits. Likewise, other error metrics can be suitably optimized as well.

Rate control or the ability of an encoder to produce a compressed file of a desired size is not easy to perform with a single QP across the entire frame.

Ideally therefore, it should be possible to allow the encoder to vary QP across the image in an arbitrary manner. However, this means that the actual value of QP used for each data partition (macroblock/tile/channel/sub band, etc.) should be signaled in the bitstream. This leads to an enormous overhead just to carry the QP signaling information, making it unsuitable in practice. What is desired is a flexible yet bit-economic means of signaling QP, particularly for commonly encountered scenarios.

The flexible quantization technique provides the ability to vary quantization along various partitions or dimensions of the encoded digital media data. For example, one implementation of the flexible quantization technique in the representative encoder 200/decoder 300 system can vary quantization over three dimensions—over (i) spatial locations, (ii) frequency sub bands, and (iii) color channels. However, quantization can be varied over fewer, additional or other dimensions or partitions of the data in other alternative implementations of the flexible quantization technique. This technique also includes ways to efficiently signal the flexible quantization in the encoded media data. The benefit of this quantization approach is that the overhead incurred by quantization related side information is minimized for the primary usage scenarios, while allowing maximum flexibility if desired by the encoder.

The flexible quantization technique provides fine spatial granularity control of the quantization. In one particular implementation, the flexible quantization allows control over quantization applied to the frame, tile, or down to the macroblock. If the frame is not quantized uniformly, then each tile can be quantized uniformly; if a tile is not quantized uniformly, then each macroblock will be quantized differently.

The flexible quantization further allows quantization control along the frequency sub band dimension. In one particular implementation, the flexible quantization includes a sub band mode to specify a quantization relationship among frequency sub bands. The sub bands can be quantized uniformly, or partially uniformly (low pass sub band using DC sub band quantizer, and/or high pass sub band using low pass quantizer), or independently.

The flexible quantization also allows control over quantization applied along the channel dimension of the data. In one particular implementation, the flexible quantization includes a channel mode to specify a quantization relationship among color channels. The channels can be quantized uniformly, or partially uniformly (chrominance channels uniformly but luminance independently), or independently.

The flexible quantization described herein also provides techniques to efficiently signal in side information of the compressed digital media data, combinations of the above quantization control over spatial, frequency sub band and channel that are of significance to the primary usage scenarios. Further, the flexible quantization technique provides a way to efficiently define choice of quantizer by indexing from a defined subset of possible quantizers in the digital media data.

6. Flexible Quantization in the Spatial Dimension:

In the spatial dimension, three choices are provided by the flexible quantization technique in the representative encoder/decoder:

- The entire frame can be coded using the same quantization rule.
- Else, an entire tile can be coded using the same quantization rule and different tiles within the frame can use different quantization rules.
- Else, each macroblock within a tile can be coded using the same quantization rule and different macroblocks within the tile can use different quantization rules.

One means of signaling these possibilities is as follows: A binary signal is sent in the bitstream at the frame level indicating whether the first possibility is true. If not, a fixed length symbol is sent in the bitstream within each tile indicating the number of quantization rules used for this tile. If the tile uses more than 1 quantization rule, then a variable length symbol is sent within each macroblock within the corresponding tile that indicates the quantization rule used by the macroblock. The decoder interprets the bitstream in a manner consistent with the encoder.

The representative encoder 200/decoder 300 uses a variant of the above signaling. A binary signal, represented by a generic syntax element, herein labeled as "XXX_FRAME_UNIFORM," is only sent at the frame level (where XXX is a placeholder specifying the particular frequency sub band or channel dimension of quantizer control). At the tile level, the number of distinct quantizer rules is sent in a tile-level syntax element (XXX_QUANTIZERS) only when the frame level syntax element (XXX_FRAME_UNIFORM) is false. If this number is equal to 1, it means that there is only one rule and therefore all macroblocks within the tile are uniformly coded with the same quantization rule (indicating choice 2), and if not it indicates choice of the third possibility.

7. Flexible Quantization Across Frequency Bands:

For flexible quantization across frequency bands, the bitstream syntax of the representative encoder 200/decoder 300 defines two switches:

The low pass macroblock uses the same quantization rule as the DC macroblock at the same spatial location. This corresponds to the syntax element USE_DC_QUANTIZER.

The high pass macroblock uses the same quantization rule as the low pass macroblock at the same spatial location. This corresponds to the syntax element USE_LP_QUANTIZER.

These switches are enabled at the frame layer when the entire frame uses the same quantization rule, or at the tile layer otherwise. These switches are not enabled at the macroblock layer. All macroblocks within a tile therefore obey the same rules across frequency bands. A binary symbol is sent for each of the switches at the appropriate (frame or tile) layer.

8. Flexible Quantization Across Image Channels:

For flexible quantization across channels, the bitstream syntax of the representative encoder 200/decoder 300 permits three choices:

All channels—luminance and chrominance have the same quantization rule. This is indicated by the generic syntax element XXX_CH_MODE==CH_UNIFORM.

Luminance follows one quantization rule and all chrominance channels follow a different quantization rule, indicated by XXX_CH_MODE==CH_MIXED.

All channels are free to choose different quantization rules, indicated by XXX_CH_MODE==CH_INDEPENDENT.

9. Combinatorial Flexible Quantization:

The representative encoder 200/decoder 300 uses a bitstream syntax defined in the code tables shown in FIGS. 4-14 that can efficiently encode the particular choice out of the flexible quantization options across the dimensions discussed above. With several quantization options available across each of the spatial, frequency sub band and channel dimensions, the number of permutations of the available quantization options is large. Adding to the complexity of flexible quantization across the three dimensions is the fact that the bitstream of the representative encoder 200/decoder 300 can be laid out in spatial or frequency ordering. However, this does not change the available quantization options, and only affects the serialization of the signals. The syntax defined in FIGS. 4-14 provides an efficient coding of the combinatorial flexible quantization rules.

Some salient features of the combinatorial quantization rules as defined in the syntax of the representative encoder/decoder are as follows.

DC quantization is not allowed to vary on a macroblock basis. This allows the differential coding of quantized DC values without having to do an inverse scaling operation. Coding the DC band of an image tile with a relatively small quantizer even when the AC (low pass and high pass) bands are coded with varying quantization does not appreciably affect the bit rate.

At one end of the scale, all transform coefficients within a frame use the same quantization parameter. At the other end of the scale, low pass and high pass quantization rules for all channels are allowed to vary independently for each macroblock of the tile/frame. The only restriction is that the number of distinct low pass and high pass quantizer rules (covering all channels) is each restricted to 16. Each such rule may specify independent values of quantization parameter for each channel.

Between these extremes, several combinations are permitted as specified by the syntax tables shown in FIGS. 4-14.

10. Indexing of Quantizer Parameters:

The specific quantization parameter (QP) in the representative encoder/decoder is based on the harmonic quantizer scale discussed above. An 8 bit value of a quantizer parameter index (QPI) corresponds to a value of QP according to the formula (1) above, which QP value can be relatively large. A second level of indexing is performed so that QPIs varying across macroblocks can be coded in an efficient manner.

More particularly, the encoder 200 can define a set in the bitstream containing between 1 and 16 QPI "vectors." Each QPI vector is composed of one or more QPI values, based on which XXX_CHANNEL_MODE is chosen. Such sets are defined for DC, low pass and high pass sub bands, based on the frequency band switch. Further, the DC set has only one QPI vector since only one DC quantizer is permissible in a tile-channel. The coding of these sets is defined in the tables shown in FIGS. 4-6.

As shown in the tables of FIGS. 7-11, signaling of the QPI vector sets of DC, low pass and high pass frequency sub bands occurs as follows. Based on the other coding modes, the cardinality of each set (i.e., the number of QPI vectors in the set) is indicated for low pass and high pass sub bands at the start of the corresponding tile or frame. The cardinality of the DC set is 1. In the pseudo-code tables, the syntax element denoting cardinality is labeled as "XXX_QUANTIZERS." (In practice, XXX_QUANTIZERS-1 is sent in the bitstream.) The syntax elements labeled "XXX_QUANTIZER" in the tables denotes the coding of QPI sets, which is defined in the tables shown in FIGS. 4-6.

At the macroblock level, it is sufficient to send only the index QI of the desired QPI vector from within the QPI set. The tables in FIGS. 12-14 define the syntax of sending QI on a macroblock basis. The syntax element corresponding to QI is labeled, "XXX_QUANTIZER_INDEX." A variable length code is used to signal QI. First, a one bit symbol is sent indicating whether QI is zero or not. If not, then a fixed length code of length being given by ceil($\log_2$(XXX_QUANTIZERS-1)) is sent indicating the specific QI different from zero. This allows for an efficient encoding of a "default" quantization rule (QI=0) with as low as one bit per macroblock. When XXX_QUANTIZERS is 1, XXX_QUANTIZER_INDEX is uniquely zero and therefore QI need not be signaled.

11. Flexible Quantization Variations

The above description of the flexible quantization is specific to its implementation in a representative encoder and decoder, and syntax. However, the principles of this technique are extensible to other digital media compression systems and formats as well. For instance, the representative encoder/decoder has only three frequency sub bands (DC, low pass and high pass). But, more generally, alternative implementations of the flexible quantization can be extended in a straightforward manner to a multitude of frequency sub bands. Likewise, alternative flexible quantization implementations can vary the quantizer at finer spatial granularity, such as by sending quantization index (QI) information at the sub-macroblock (such as block) level. Many extensions to the underlying principles of the flexible quantization technique are possible within the same framework.

12. Compressed Domain Contrast Adjustment

The harmonic quantization scale described herein above also enables contrast adjustment of an image in the compressed domain. With QP chosen from a harmonic scale per rule (1) above and signaled by the index QI, the contrast of the image can be easily adjusted in the compressed domain itself by tweaking the QI values signaled in the bitstream. The transform coefficients themselves need not be altered. In this way, contrast adjustment can be accomplished without having to fully decode, adjust the contrast in the spatial/time domain, and re-encode the image. This is possible since the quantization index can be incremented or decremented across all the quantizer parameters for the various sub-bands and color channels.

In the representative encoder/decoder, the compressed domain contrast adjustment technique performs contrast adjustment by uniformly incrementing (or decrementing) the quantization index values encoded in the QPI vector sets of quantizers (tables shown in FIGS. 4-6) of the compressed bitstream 220 (FIGS. 2, 3). For example, by incrementing the QI that defines all quantization parameters via the rule (1) above by the value 8, the contrast is adjusted by a factor approximately equal to sqrt(2) or 1.4.

Some additional adjustments may be needed if the mantissa parts of the various QPs vary by a large amount. Further, this simple rule does not apply in the denormal portion of the quantizer rule (1), i.e., for QI between 1 and 15 inclusive. However, for a large class of compressed images, the harmonic scale and fixed length signaling of QI provides a simple means of adjusting contrast in the compressed domain itself. This has the benefit of computational ease, and also minimizing re-encoding error.

13. Computing Environment

The above-described processing techniques for flexible quantization can be realized on any of a variety of digital media encoding and/or decoding systems, including among other examples, computers (of various form factors, including server, desktop, laptop, handheld, etc.); digital media recorders and players; image and video capture devices (such as cameras, scanners, etc.); communications equipment (such as telephones, mobile phones, conferencing equipment, etc.); display, printing or other presentation devices; and etc. The flexible quantization techniques can be implemented in hardware circuitry, in firmware controlling digital media processing hardware, as well as in communication software executing within a computer or other computing environment, such as shown in FIG. 15.

FIG. 15 illustrates a generalized example of a suitable computing environment (1500) in which described embodiments may be implemented. The computing environment (1500) is not intended to suggest any limitation as to scope of use or functionality of the invention, as the present invention may be implemented in diverse general-purpose or special-purpose computing environments.

With reference to FIG. 15, the computing environment (1500) includes at least one processing unit (1510) and memory (1520). In FIG. 15, this most basic configuration (1530) is included within a dashed line. The processing unit (1510) executes computer-executable instructions and may be a real or a virtual processor. In a multi-processing system, multiple processing units execute computer-executable instructions to increase processing power. The memory (1520) may be volatile memory (e.g., registers, cache, RAM), non-volatile memory (e.g., ROM, EEPROM, flash memory, etc.), or some combination of the two. The memory (1520) stores software (1580) implementing the described digital media encoding/decoding with flexible quantization techniques.

A computing environment may have additional features. For example, the computing environment (1500) includes storage (1540), one or more input devices (1550), one or more output devices (1560), and one or more communication connections (1570). An interconnection mechanism (not shown) such as a bus, controller, or network interconnects the components of the computing environment (1500). Typically, operating system software (not shown) provides an operating environment for other software executing in the computing environment (1500), and coordinates activities of the components of the computing environment (1500).

The storage (1540) may be removable or non-removable, and includes magnetic disks, magnetic tapes or cassettes, CD-ROMs, CD-RWs, DVDs, or any other medium which can be used to store information and which can be accessed within the computing environment (1500). The storage (1540) stores instructions for the software (1580) implementing the described digital media encoding/decoding with flexible quantization techniques.

The input device(s) (1550) may be a touch input device such as a keyboard, mouse, pen, or trackball, a voice input device, a scanning device, or another device that provides input to the computing environment (1500). For audio, the input device(s) (1550) may be a sound card or similar device that accepts audio input in analog or digital form from a microphone or microphone array, or a CD-ROM reader that provides audio samples to the computing environment. The output device(s) (1560) may be a display, printer, speaker, CD-writer, or another device that provides output from the computing environment (1500).

The communication connection(s) (1570) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described digital media encoding/decoding with flexible quantization techniques herein can be described in the general context of computer-readable media. Computer-readable media are any available media that can be accessed within a computing environment. By way of example, and not limitation, with the computing environment (1500), computer-readable media include memory (1520), storage (1540), communication media, and combinations of any of the above.

The described digital media encoding/decoding with flexible quantization techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A method of coding/decoding digital media, comprising:
applying forward or reverse operations of a transform on blocks of digital media data;
applying forward or reverse quantization to transform coefficients of the digital media data based on a quantization parameter chosen from a harmonic quantizer scale, wherein the quantization parameter is derived from an integer-valued index i, and a constant value c, as follows:

$$QP_i = ((i \bmod c) + c) \cdot 2^{\lfloor \frac{i-c}{c} \rfloor}; \text{ and}$$

performing coding or decoding of the quantized transform coefficients in a compressed bitstream.

2. The method of claim 1 wherein the harmonic quantizer scale comprises a normal portion.

3. The method of claim 2 wherein the harmonic quantizer scale further comprises a denormal portion composed of a linear sequence of numbers.

4. The method of claim 1, wherein the constant value c equals a power of 2.

5. The method of claim 1, wherein the constant value c is the number 16.

6. The method of claim 1, wherein the constant value c is the number 32.

7. The method of claim 1, further comprising:
signaling at least one quantization parameter chosen from the harmonic quantizer scale in the compressed bitstream using a coded symbol for the integer-valued index i.

8. A computer-readable storage having instructions thereon, which are not consisting of a signal, for executing a method comprising:
receiving digital media data;
applying forward or reverse quantization to transform coefficients of the digital media data to quantized transform coefficients based on a quantization parameter chosen from a harmonic quantizer scale, wherein the quantization parameter is derived from an integer-valued index i, and a constant value c, as follows:

$$QP_i = ((i \bmod c) + c) \cdot 2^{\lfloor \frac{i-c}{c} \rfloor}; \text{ and}$$

performing coding or decoding of the quantized transform coefficients in a compressed bitstream.

9. The method of claim 8 wherein the harmonic quantizer scale comprises a set of numbers related to each other via a simple fraction.

10. The method of claim 8 wherein the harmonic quantizer scale comprises a normal portion.

11. The method of claim 8 wherein the harmonic quantizer scale further comprises a denormal portion composed of a linear sequence of numbers.

12. The method of claim 8 wherein the constant value c equals a power of 2.

13. The method of claim 8 wherein the constant value c is the number 16.

14. The method of claim 8 wherein the constant value c is the number 32.

15. The method of claim 8, further comprising:
signaling at least one quantization parameter chosen from the harmonic quantizer scale in the compressed bitstream using a coded symbol for the integer-valued index i.

16. The method of claim 8, further comprising:
modifying the coded symbol of the integer-valued index i in the compressed bitstream to effect contrast adjustment of an image represented by the digital media data.

17. The method of claim 8, further comprising:
signaling a plurality of quantization parameters flexibly applied to separate partitions of the digital media data in the compressed bitstream using a sequence of coded symbols to define a table of quantization parameters represented via the rule by integer-valued indices i.

18. The method of claim 17, further comprising:
modifying the coded symbols in the table of quantization parameters in the compressed bitstream to effect contrast adjustment of an image represented by the digital media data.

19. At least one program-storing device having program code stored thereon, which is not consisting of a signal, for causing a digital media processing device to perform a method of decoding digital media data according to a codec, the method comprising:
decoding a quantizer symbol from a compressed bitstream representing a quantization parameter chosen from a harmonic quantizer scale for at least a portion of digital media data in the compressed bitstream;
decoding transform coefficients of the digital media data portion in the compressed bitstream;
dequantizing the decoded transform coefficients based on the quantization parameter; and
performing an inverse transform to reconstruct digital media;
wherein the quantizer symbol is an integer-valued index i that represents the quantization parameter according to a rule defining the harmonic quantizer scale as follows:

$QP_i = i$ for $1 \le i \le 15$ $$QP_i = ((i \bmod c) + c) \cdot 2^{\lfloor \frac{i-c}{c} \rfloor}$$

for all other values of i.

* * * * *